M. A. SCANLON.
Machines for Cutting Matches.
No. 134,565.            Patented Jan. 7, 1873.
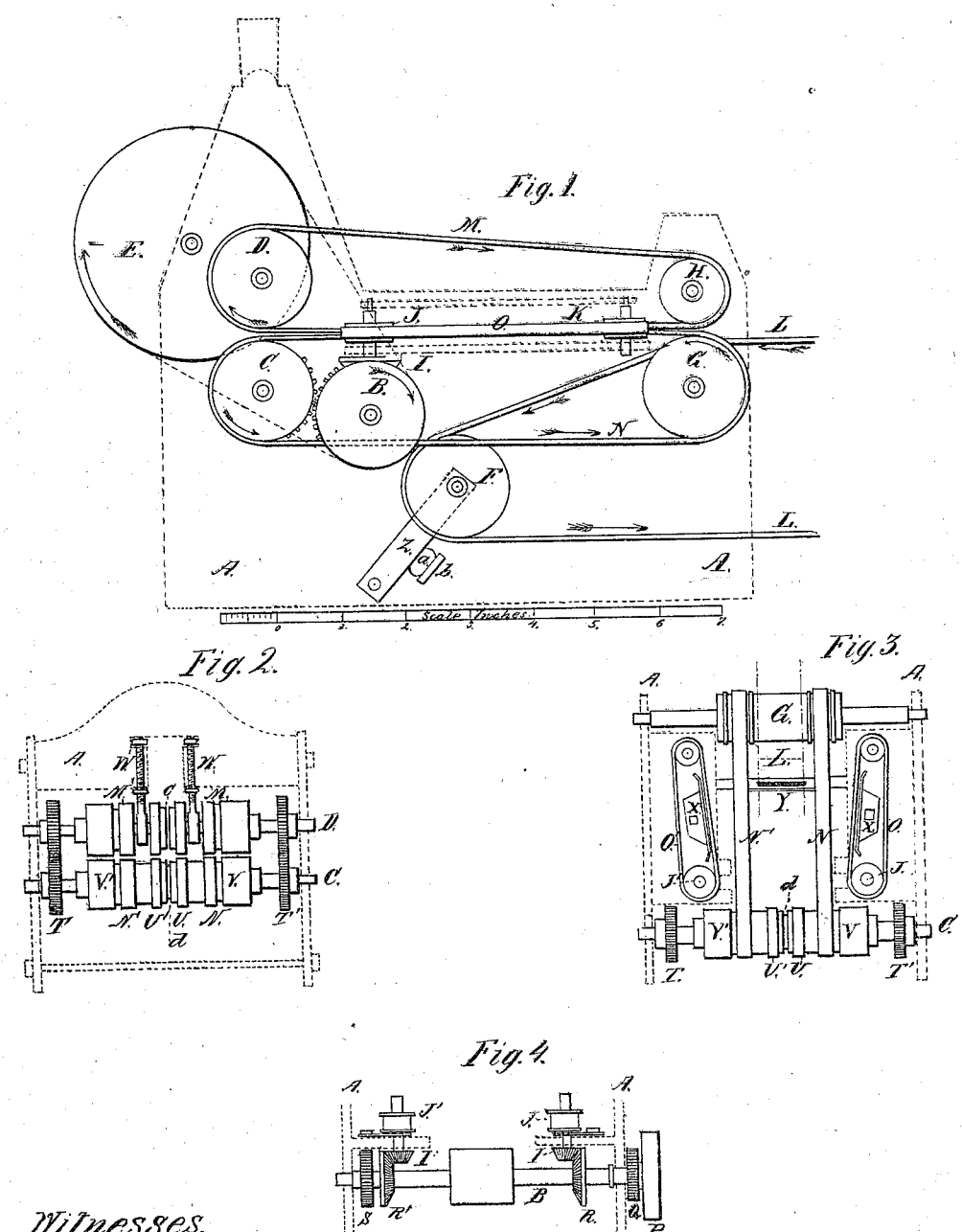

UNITED STATES PATENT OFFICE.

MATTHEW A. SCANLON, OF AKRON, EXECUTOR OF THOMAS G. MURPHY, DECEASED; SAID SCANLON ASSIGNOR OF ONE-HALF HIS RIGHT TO HARRISON S. DANFORTH, OF MIDDLEBURY, OHIO.

IMPROVEMENT IN MACHINES FOR CUTTING MATCHES.

Specification forming part of Letters Patent No. 134,565, dated January 7, 1873.

*To all whom it may concern:*

Be it known that THOMAS G. MURPHY, late of Mohawk, in the county of Herkimer and State of New York, deceased, did invent certain Improvements in Machines for Cutting Matches, of which the following is a specification:

In the process of manufacturing matches by machinery or otherwise it is found to be economical to make the sticks of the length of two matches, coating each end of the stick with the igniting compound, and subsequently dividing the sticks, in which last operation it not unfrequently happens that matches are ignited, often causing great waste. It is the purpose of this invention to obviate the waste incident to the ordinary modes of cutting matches, thereby insuring an increased profit to the manufacturer, and also greater security against the inflammatory character of the materials used.

The invention consists essentially in a combination of belts, webs, shafts, cylinders, and pulleys for receiving the uncut match-sticks and conveying them to a rotating circular knife, together with devices for holding the matches securely while passing under the rotating cutter, and also for preventing the matches from igniting, and for extinguishing them if they become ignited.

Figure 1 is a side elevation of a machine embodying this invention, the principal moving parts being represented by full lines, the frame and a belt outside of the frame being indicated by dotted lines. Fig. 2 is an end elevation, showing certain parts in detail which could not be shown in Fig 1. Fig. 3 is a view looking down on top, showing other parts in detail. Fig. 4 shows in detail some of the parts behind those shown in Fig. 2.

A is the frame of the machine, represented by dotted lines in the several figures. It should be made of metal, and securely fastened. Motion is imparted to the several moving parts of the machine through the shaft B, which has a pulley, P, on its outer end, as shown in Fig. 4, for that purpose. The pulley Q, Fig. 4, is connected by a belt with a pulley (not shown) on the outer end of the shaft that carries a rotating knife-edged cutter, E, said pulley being of the same diameter as the rotating cutter E. The belt which connects these two pulleys last mentioned is indicated in Fig. 1 by dotted lines from B to E. The beveled gears R I and R' I' impart motion to the vertical pulleys J J', which pulleys give motion to two belts, O O', moving in an oblique plane, vertical as to their width. Two other pulleys, K, Fig. 1, (not lettered in Fig. 3,) support and guide the two belts O O' at the other end of their circuit. The cog-wheel S, Fig. 4, imparts motion to the shaft C through the cog-wheel T, Fig. 2. This gearing is partly sketched in Fig. 1. On the central portion of the shaft B, Fig. 4, is shown a cylindrical pulley, against which another similar cylindrical pulley, F, Fig. 1, is pressed by means of a spring of elastic rubber, *a*, placed between a suitable resisting-point, *b*, and a pivoted lever, Z, arranged to support the pulley-shaft F and press it toward the cylindrical pulley on the shaft B. Each end of the shaft F is similarly supported and pressed toward B. The pressure between the two pulleys on the shafts B and F makes these pulleys embrace and move an endless web, L, passing between them. The endless web L serves to make connection between the machine now under consideration and one from which it is to be supplied with match-sticks to be cut. The cog-wheels T and T', on the ends of the shaft C, Fig. 2, gear into two similar cog-wheels on the ends of the shaft D. The shaft D is divided in its center at *c*, to permit the rotary cutter E to rotate in the space between the divided parts. The adjustable parts W W' are supports of the divided shaft D, and serve to bring the elastic surfaces of the shafts C and D in proper relation to each other. In the shaft C is cut a groove, *d*, in which the edge of the rotary cutter E runs. The parts X X', Fig. 3, are guides, to prevent the belts O O' from being deflected out of their plane of motion when the machine is in operation. The part Y is a fixture, serving as a guide to the web L to direct said web properly between the cylindrical pulleys on the shafts B and F. The pulleys G and H serve as supports and guides for the elastic belts M M' and N N', which belts receive motion from the shafts C and D. The web L passes over the pulley G, between the elastic belts N and N'. The rotary cutter, the several pulleys, belts, &c., move in the directions indicated by the arrows in Fig. 1. The surfaces of the oblique belts O O' nearest the guides X X' move in the direction of the shaft C, Fig. 3, with a rate of motion equal to that of the belts M and N. The shaft C bears several cylindrical soft-rubber rings, U U' and V V'. Opposite to these are similar rings of soft rubber on the divided shaft D. The belts M M', N N', and O O' are preferably of soft rubber. The endless web L may be of any suitable flexible material. The beveled gears R I and R' I', together with the pulleys J J' and guides X X', should be made adjustable to the variation in the length of match-sticks of different manufacturers, so that an uncut match-stick may have just space enough to pass freely at the point where the belts O O' nearest approach each other.

Operation.

Let it now be supposed that the machine under consideration is connected by means of the web L with another machine which completes the matches ready for cutting, and delivers them on and across the upper surface of the web L, near the pulley G. They are carried by the web L to the pulleys G and H, where they are embraced by the opposite belts M N and M' N', and carried toward the shafts C D. In their progress from G to C the ends of the matches are evened by the oblique belts O O', so that the center of each match-stick is brought to the center of the path through which the matches move to reach the cutter E. As the match-sticks are carried between the shafts C and D, they are firmly clasped by the several soft-rubber feeding rings and belts on said shafts, and are not released until divided by the cutter. In practice, it frequently happens that contiguous matches become cemented together at their ends by the igniting compound, the breaking of which is sometimes sufficient to ignite the matches. The soft-rubber rings V V', on the shafts C and D, effectually separate adherent matches, and extinguish them, if they ignite, by closing firmly over the igniting compound.

Claims.

I do not claim any of the modes of gearing or of transmitting motion described in connection with this invention, as they are known, and have been elsewhere variously applied; nor do I claim any devices for the adjustment of adjustable parts employed or described in this invention, as I am aware that all such have been used before.

I claim—

1. The combination of the cutting device E and the several elastic rings U U' and V V' on the shafts C and D, to hold the match-sticks while they are passing under the cutting device E, substantially as described.

2. The combination of the conveying-belt L, the oblique bands O O', and guides X X', to bring the middle of the match-sticks opposite the cutting device E.

3. The combination of the elastic belts M N and M' N', the oblique belts O O', and guides X X', and elastic rings U U' and V V', when constructed as and for the purpose described.

M. A. SCANLON,
*Executor.*

Witnesses:
E. P. MUN,
MARTIN ROACH.